United States Patent
Kimmel et al.

(10) Patent No.: US 10,401,376 B2
(45) Date of Patent: Sep. 3, 2019

(54) CO-LOCATION OF HIGH-MAINTENANCE AIR DATA SYSTEM COMPONENTS INTO ONE LRU

(71) Applicant: Honeywell International Inc., Morristown, NJ (US)

(72) Inventors: Danny Thomas Kimmel, Phoenix, AZ (US); Brett Gordon Northcutt, Paradise Valley, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 331 days.

(21) Appl. No.: 14/334,911

(22) Filed: Jul. 18, 2014

(65) Prior Publication Data

US 2015/0276787 A1 Oct. 1, 2015

Related U.S. Application Data

(60) Provisional application No. 61/971,874, filed on Mar. 28, 2014.

(51) Int. Cl.

| | | |
|---|---|---|
| *G01P 5/165* | (2006.01) | |
| *G01P 5/14* | (2006.01) | |
| *G01P 13/00* | (2006.01) | |
| *G01P 13/02* | (2006.01) | |

(52) U.S. Cl.
CPC ............. *G01P 5/165* (2013.01); *G01P 5/14* (2013.01); *G01P 13/025* (2013.01); *Y10T 156/10* (2015.01)

(58) Field of Classification Search
CPC .......... G01P 15/025; G01P 5/165; G01P 4/14; G01P 13/0066

USPC .......................................... 73/170.02, 170.14
See application file for complete search history.

(56) References Cited

U.S. PATENT DOCUMENTS

| | | | | | |
|---|---|---|---|---|---|
| 4,182,188 A | * | 1/1980 | Britton | .................. | G01L 9/0051 73/180 |
| 5,001,638 A | * | 3/1991 | Zimmerman | ........ | G05D 1/0077 244/194 |
| 5,457,630 A | * | 10/1995 | Palmer | .................... | B64C 13/50 180/116 |

(Continued)

FOREIGN PATENT DOCUMENTS

| | | |
|---|---|---|
| CN | 101273273 A | 9/2008 |
| CN | 101793594 A | 8/2010 |

(Continued)

OTHER PUBLICATIONS

European Patent Office, "Communication pursuant to Article 94(3) EPC", "from foriegn counterpart of U.S. Appl. No. 14/334,911", dated Mar. 4, 2016, pp. 16, Published in: EP.

(Continued)

*Primary Examiner* — Daniel J Colilla
(74) *Attorney, Agent, or Firm* — Fogg & Powers LLC

(57) ABSTRACT

Systems and methods for the co-location of high-maintenance air data system components into one LRU are disclosed. In at least one embodiment, an air data sensing line-replaceable unit (LRU) comprises at least one pressure sensor and at least one probe or port coupled to the at least one pressure sensor. The at least one probe or port conduits air located outside the air data sensing LRU to the at least one pressure sensor. Further, the at least one probe or port and the at least one pressure sensor are connected to each other by a permanent connection.

18 Claims, 3 Drawing Sheets

(56) References Cited

U.S. PATENT DOCUMENTS

| | | | | |
|---|---|---|---|---|
| 6,038,932 | A * | 3/2000 | Wandel | G01P 5/165 73/182 |
| 6,070,475 | A * | 6/2000 | Muehlhauser | G01F 1/46 374/E13.006 |
| 6,591,696 | B2 | 7/2003 | Bachinski | |
| 7,490,510 | B2 * | 2/2009 | Agami | G01K 13/02 73/170.02 |
| 8,060,334 | B1 * | 11/2011 | Jarvinen | B64D 15/12 340/582 |
| 8,256,284 | B2 | 9/2012 | Vozhdaev et al. | |
| 2002/0121135 | A1 | 9/2002 | Rediniotis et al. | |
| 2003/0010130 | A1 * | 1/2003 | Bachinski | G01P 5/165 73/747 |
| 2003/0150274 | A1 * | 8/2003 | Pitzer | G01L 19/147 73/715 |
| 2008/0047338 | A1 * | 2/2008 | DuPuis | G01P 5/165 73/170.02 |
| 2008/0143569 | A1 | 6/2008 | DuPuis et al. | |
| 2008/0218385 | A1 * | 9/2008 | Cook | B64D 15/20 340/962 |
| 2009/0320586 | A1 * | 12/2009 | Elgersma | G01P 5/16 73/180 |
| 2011/0081981 | A1 * | 4/2011 | Okamoto | A63B 69/0002 473/233 |
| 2012/0144931 | A1 * | 6/2012 | Michel | G01P 5/165 73/861.42 |
| 2014/0245830 | A1 * | 9/2014 | Martin | G01P 5/165 73/178 R |
| 2015/0082893 | A1 * | 3/2015 | Haywood | G01L 9/0041 73/723 |
| 2016/0266164 | A1 * | 9/2016 | Ellison | B64D 43/02 |

FOREIGN PATENT DOCUMENTS

| | | |
|---|---|---|
| CN | 102419381 A | 4/2012 |
| CN | 102865068 | 1/2013 |
| EP | 1275952 | 1/2003 |
| EP | 1275952 A2 | 1/2003 |
| WO | 0023775 | 4/2000 |
| WO | 2000023775 A1 | 4/2000 |

OTHER PUBLICATIONS

European Patent Office, "Extended European Search Report from EP Application No. 15158842.3 dated Jul. 13, 2015", "from Foreign Counterpart of U.S. Appl. No. 14/334,911", Jul. 13, 2015, pp. 16, Published in: EP.
Hagen et al., "Deutsche Airbus Flight Test of Rosemount Smart Probe for Distributed Air Data Systems", "IEEE AES Systems Magazine", Apr. 1994, pp. 7-14, vol. 9, No. 4.
European Patent Office, "Communication under Rule 71(3) EPC for EP Application No. 15158842.3", "Foreign counterpart to U.S. Appl. No. 14/334,911", "dated Feb. 8, 2017", Published in: EP.
IEEE Aerospace and Electronic, "Deutsche Airbus flight test of Rosemount smart probe for distributed air data systems", vol. 9 Issue: 4, Apr. 1994, pp. 1-9.
State Intellectual Property Office, P.R. China, "First Office Action from CN Application No. 201510559294.X dated Jul. 30, 2018", from foreign counterpart of U.S. Appl. No. 14/334,911, pp. 1-15, Published in: CN.
National Intellectual Property Administration, P.R. China, "Second Office Action from CN Applicatio No. 201510229294.X dated Mar. 29, 2019", from Foreign Counterpart to U.S. Appl. No. 14/334,911, pp. 1-18, Published: CN.

* cited by examiner

US 10,401,376 B2

CO-LOCATION OF HIGH-MAINTENANCE AIR DATA SYSTEM COMPONENTS INTO ONE LRU

CROSS-REFERENCE TO RELATED APPLICATIONS

This application claims the benefit of U.S. Provisional Patent Application Ser. No. 61/971,874, filed on Mar. 28, 2014, which is hereby incorporated herein by reference.

BACKGROUND

Present day air data systems are comprised of one or more conventional probes or ports, such as static ports, pitot tubes, pitot-static tubes, and angle of attack (AoA) vanes. The probe(s) and port(s) conduit air external to the aircraft to a line-replaceable unit (LRUs), containing both the pressure sensor(s) and electronics. The LRU then converts the pneumatic pressure into flight parameters such as altitude, air speech, AoA, Mach number, etc. for use in the aircraft's systems. Alternatively, an LRU may convert the pneumatic pressure into a temperature corrected digital representation, using an Air Data Module (ADM) for consumption by other systems on the aircraft.

Another version of a present day system is one comprised of a combination of a probe(s) or port(s), a pressure sensor(s) and electronics to form one LRU. In this system, all sensing, analog-to-digital (A/D) conversion, and computation is performed in a single LRU. More specifically, the electronics convert air pressure that the probe(s) or port(s) conduits to the electronics into flight parameters, such as airspeed and altitude. This combined LRU, an example of which is described in U.S. Pat. No. 8,620,495, senses any combination of static, pitot, and AOA, and computes flight parameters in the LRU sending those parameters to other systems on the aircraft bus.

SUMMARY

Systems and methods for the co-location of high-maintenance air data system components into one LRU are disclosed. In at least one embodiment, an air data sensing line-replaceable unit (LRU) comprises at least one pressure sensor and at least one probe or port coupled to the at least one pressure sensor. The at least one probe or port conduits air located outside the air data sensing LRU to the at least one pressure sensor. Further, the at least one probe or port and the at least one pressure sensor are connected to each other by a permanent connection.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
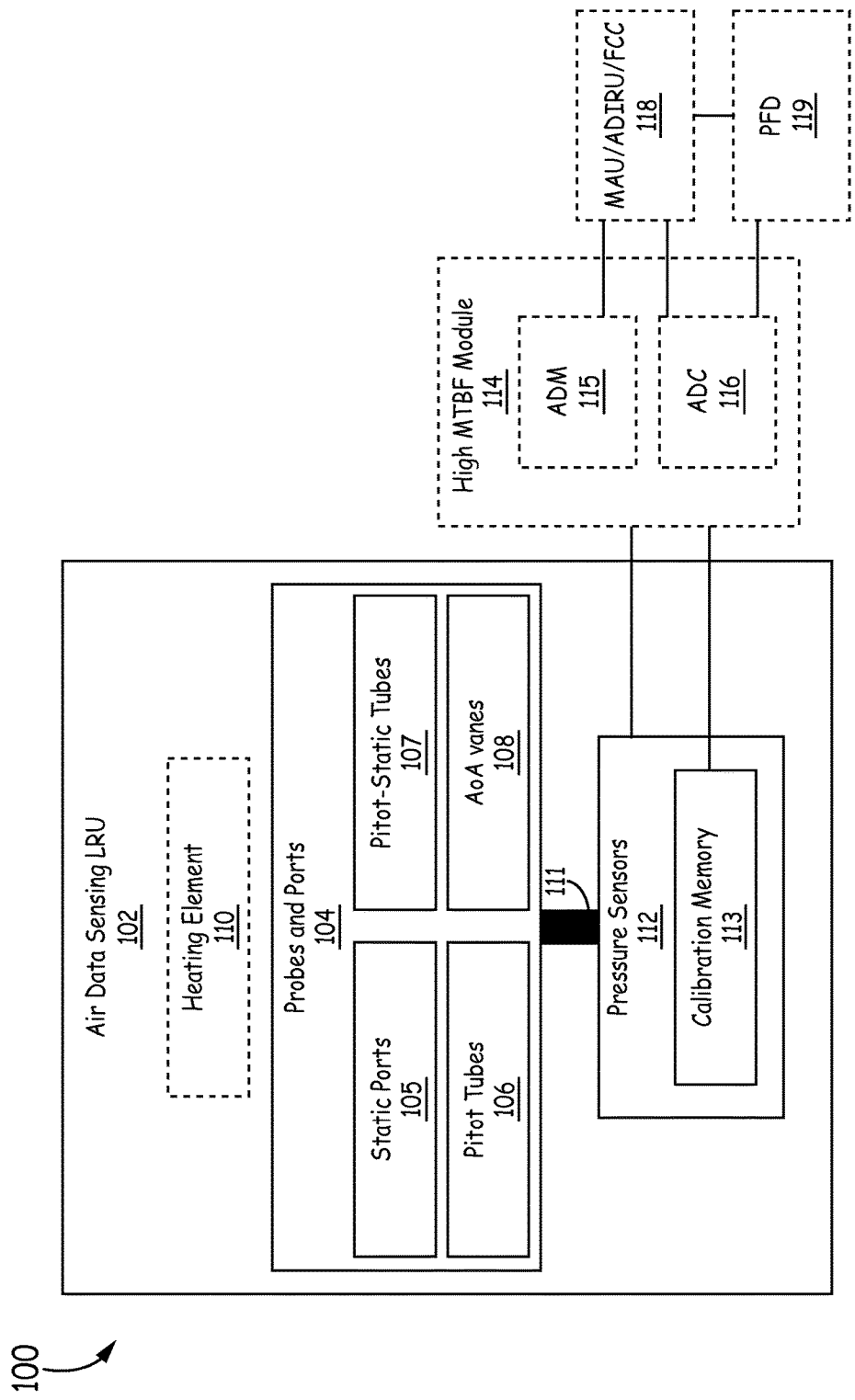
FIG. 1 is a block diagram of an example system that includes an air data sensing LRU that co-locates the high-maintenance air data system components into one LRU.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As explained above, in some conventional implementations of an air data system, the probe or port is separate from the pressure sensor and the electronics. The connections between the probe or port and the pressure sensor are via a pneumatic hose or tube. The pneumatic hose or tube is a non-permanent connection that connects the probe or port to the pressure sensor. Such non-permanent connections are used because the probe or port is located remotely from the pressure sensor within an aircraft and/or because the probe is provided by a different supplier than the sensor. Because of this, the probe or port and the pressure sensor are installed separately and a hose/tube is used to connect the probe or port to the pressure sensor. All of this is done in the field, so the connections (i.e., a hose/tube) between the probe or port and the pressure sensor is a connection that can be accomplished in the field. Examples of such non-permanent connections include a hose clamp, screw type connection, quick connects, bayonets, Swageloks, or other pneumatic connectors with or without locking mechanisms.

As a result of these non-permanent connections, these conventional air data systems can be more prone to pressure leaks causing the installation and servicing of these connections to include cumbersome troubleshooting tests to ensure overall system integrity. Additionally, the installation and maintenance of these connections can be time consuming and result in lost revenue for the operator.

In other conventional implementations, as discussed above, the probe or port, the pressure sensor and electronics are combined into one LRU. This results in having to remove and potentially replace the probe or port, the pressure sensor, and the electronics as a unit when servicing any of the constituent parts, i.e., the probe or port, the pressure sensor and the electronics. This can lead to time and expense waste because the probe or port and the pressure sensor have a relatively low mean time between failure (MTBF) while the electronic components have a MTBF that can be at least an order of magnitude greater. The low MTBF in the probe or port is in part due to corrosion, dirt, bugs, and/or other obstructions, damage (striking the probe or port with a ladder or jetway) and outright failure. The pressure sensor oftentimes have a low MTBF due to pressure accuracy drift as well as contamination that induces erroneous measurements. In such implementations, the electronics are disconnected from the aircraft more often than they need to be, which results in extra time and expenses for the operators and can lead to unnecessary down time and lost revenue.

The embodiments in this disclosure solve the problems in both of these types of conventional implementations by having a single sub-assembly that includes the high maintenance items and excludes the low maintenance items. This sub-assembly is easily replaced on the aircraft without the need for troubleshooting. The sub-assembly also includes a permanent connection between the sensor and probe which is less prone to leaks than conventional non-permanent connections.

FIG. 1 is a block diagram of an example system 100 that includes an Air Data Sensing LRU 102 that co-locates the high-maintenance air data system components into one LRU 102. The Air Data Sensing LRU 102 will also be referred to herein as the sensing LRU 102 or sub-assembly 102. The sensing LRU 102 is a single LRU that includes at least one probe or port 104 coupled to at least one pressure sensor 112, wherein the probe or port 104 conduits air located outside the sensing LRU 102 to the at least one pressure sensor 112. As a result of this configuration, all the high maintenance items (i.e., the probe(s) or port(s) 104, the heating elements 110 and the pressure sensor(s) 112) are contained in one LRU for easy removal and replacement. In exemplary embodiments, the sensing LRU 102 can be serviced from outside the aircraft in order to substantially reduce the repair and/or replacement time. Moreover, in exemplary embodiments, the sensing LRU 102 can be replaced on a scheduled basis, thereby avoiding loss of revenue due to down time. Because many pressure sensors 112 lack long term accuracy stability, the proactive replacement effectively reduces the probability of an undetected common mode failure between replicates on the aircraft from creating a safety hazard. In some other embodiments, the sensing LRU 102 can be replaced after one of the components 104-113 in the sensing LRU 102 fails.

Figure 2A:
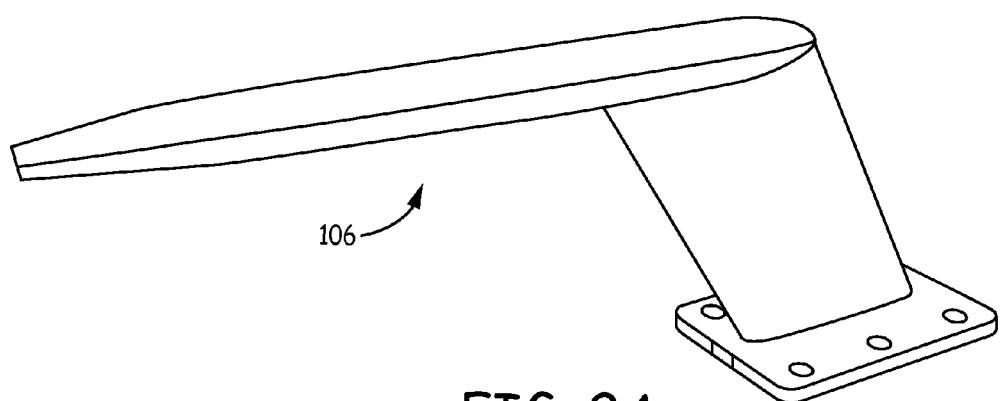
FIG. 2A is an image of an example probe for use in the system of FIG. 1.

In some embodiments, the sensing LRU 102 can include one probe or port 104; and in some embodiments, the sensing LRU 102 can include more than one probe or port 104. The term "probe or port" 104 will be used herein to denote a probe, a port, or both a probe and a port. Furthermore, a sensing LRU 102 that includes a probe or port 104 can include other probes or ports, as well. In some embodiments, the probe or port 104 in the sensing LRU 102 can include one or more static ports 105, pitot tubes 106, pitot-static tubes 107, and angle of attack (AoA) vanes 108. Any combination of these probe(s) or port(s) 104 can be included. A static port 105 is a series of orifices that are essentially flush with the airport skin that conduit outside air pressure to a pressure sensor 112. A pitot tube 106 is a tube that extends into the airstream and is aligned with the fuselage such that it samples the impact pressure as the aircraft travels through the atmosphere. The pitot tube 106 conduits the impact pressure to the pressure sensor 112. The pitot-static tube 107 combines the pitot tube 106 and the static port 105 into one device. The AoA vane 108 is an apparatus that determines the direction of air flow as it passes by the aircraft. Since these components are subjected to sand, dust, atmospheric particulates, and other environmental conditions, such as rain, snow, ice, etc., they are susceptible to being worn out much quicker than the electronics that convert the pressures into digital representations. The components in the sensing LRU 102 can have a usable life of less than 20,000 hours, wherein the electronics that convert the pressure into a digital representation can have a usable life of at least ten times as great. An image of an example pitot tube 106 is shown in FIG. 2A.

The probe or port 104 in the sensing LRU 102 is connected to the pressure sensor 112 by a permanent connection 111. One of the benefits of securing the pressure sensor 112 to the probe or port 104 by a permanent connection 111 is the reduced likelihood of leaks. Such a permanent connection 111 is not intended to be disconnected in the field. Examples of a permanent connection 111 include, but are not limited to: welding, brazing or bonding. An example of bonding includes using an epoxy to make the permanent connection 111. By connecting the pressure sensor 112 to the probe or port 104 using a permanent connection 111, the need to perform leak checks is reduced.

As mentioned above, the probe or port 104 conduits outside air pressure to the pressure sensor 112. In some embodiments, the pressure sensor 112 can include one pressure sensor. In other embodiments, the pressure sensor 112 can include more than one pressure sensor. In exemplary embodiments, there can be a pressure sensor 112 for each probe or port 104. The term "pressure sensor" 112 will be used herein to denote one or more pressure sensors. The pressure sensor 112 includes electronics to convert the air that the probe or port 104 conduits to the pressure sensor 112 into an electrical signal that is sent to the aircraft's electronics 115-116. In some embodiments, the electrical signal can be a small analog voltage and/or an output of a comparator, wherein the output of the comparator can be used to form the basis of a gate signal that is transferred to the aircraft's electronics 115-116.

Additionally, the pressure sensor 112 includes calibration memory 113, which contains information related to the calibration of the pressure sensor 112. In some embodiments, the calibration may be done in the factory; and in some embodiments, the calibration may be done in the field.

Figure 2B:
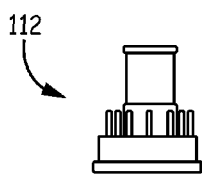
FIG. 2B is an image of an example pressure sensor for use in the system of FIG. 1.

While the pressure sensor 112 is generally not susceptible to the elements that lead to wear in the probe or port 104, they do have a lower MTBF than the aircraft's electronics because they tend to drift. As a result, the FAA is studying altimetry system errors and contemplating changing the periodic accuracy testing and maintenance requirements for these products, which for original equipment manufacturers (OEMs) is every two years. By integrating the pressure sensor 112 into the sensing LRU 102, they can be easily replaced and serviced under the potentially new FAA regulations. An image of an example pressure sensor 112 is shown in FIG. 2B.

In addition to the probe or port 104, the sensing LRU 102 can contain one or more heating elements 110. The heating elements 110 are configured to keep the probe or port 104 from ice accretion and/or are configured to device the probe or port 104 if ice has already formed. Heating elements 110 are known to have low MTBFs and be a common source of failure and subsequent unplanned removal from the aircraft. As a result, in some embodiments, the heating elements can be located in the air data sensing LRU 102.

As shown in the system 100, the pressure sensor 112 and calibration memory 113 can be coupled to one or more of the aircraft's electronic systems 115-116. In some embodiments, the coupling that connects the pressure sensor 112 and the calibration memory 113 to the electronics 115-116 can be coaxial cabling or twisted shielded pair. The electrical signal generated by the pressure sensor 112 and the calibration memory 113 contents are relayed to the aircraft's electronics systems 115-116 over this medium. The aircraft's electronic systems 115-116 are not included in the LRU 102 that includes the probe or port 104 and the pressure sensor 112. Instead, in some embodiments, the electronic systems 115-116 can be located in their own high MTBF LRU 114 as shown in FIG. 1. Or, in some other embodiments, the electronic systems 115-116 can be included in a larger computing system.

One example of an electronic system includes an Air Data Module 115 (ADM). An ADM 115, as used herein, converts the electronic signals generated by the pressure sensor 112 and calibration memory 113 into a digital representation of raw pressures and temperature or temperature corrected pressures. The digital representation of temperature corrected pressures can be used by the aircrafts Air Data Inertial Reference Unit (ADIRU), Modular Avionics Unit (MAU) or Flight Control Computer (FCC) 118 to convert the digital representation of temperature corrected pressure into altitude, air speed, AoA, Mach number and other parameters that are used by the various aircraft's systems (e.g., flight control systems, engines, cabin pressure systems, etc.).

Another example of an electronic system includes an Air Data Computer (ADC) 116. An ADC 116 converts the electronic signals generated by the pressure sensor 112 and calibration memory 113 into an altitude, air speed, AoA, Mach number, etc. for use by the various aircraft's systems.

Figure 2C:
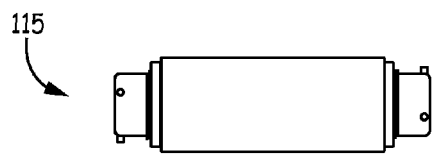
FIG. 2C is an image of an example air data module (ADM) for use in the system of FIG. 1.

In exemplary embodiments, the ADM 115 and/or the ADC 116 has a shape that enables it to be serviced from the outside of the aircraft after the sensing LRU 102 has been removed. An image of an example ADM 115 and/or ADC 116 is shown in FIG. 2C. As can be seen in the image, the ADM 115/ADC 116 is shaped so that it can be removed from the outside of the aircraft after the sensing LRU 102 is removed.

As stated above, in some embodiments, the ADM 115 can be coupled to the aircraft's ADIRU/MAU/FCC 118. The interface connecting the two can be a standard interface, such as ARINC 429, ARINC 629, RS 232 or RS 485. However, these connections are only examples and not meant to be limiting. In these embodiments, a digital representation of temperature corrected pressure and health of the ADM 115 can be sent to the ADIRU/MAU/FCC 118 in order to calculate the altitude, airspeed, and other information pertinent to the aircraft.

Similarly, in some embodiments, the ADC 116 can be coupled to the aircrafts ADIRUMAU/FCC 118 using a standard interface, such as ARINC 429, ARINC 629, RS 232 or RS 485. In some embodiments, the ADC 116 can be coupled to the aircraft's primary flight display (PFD) 119 using a standard interface, such as ARINC 429, ARINC 629, RS 232 or RS 485 interface. However, similar to above, these connections are only examples and not meant to be limiting.

In some embodiments, the ADIRU/MAU/FCC 118 can also be coupled to the PFD 119 using a standard interface, such as ARINC 429, ARINC, 629, RS 232 or RS 485.

Figure 3:
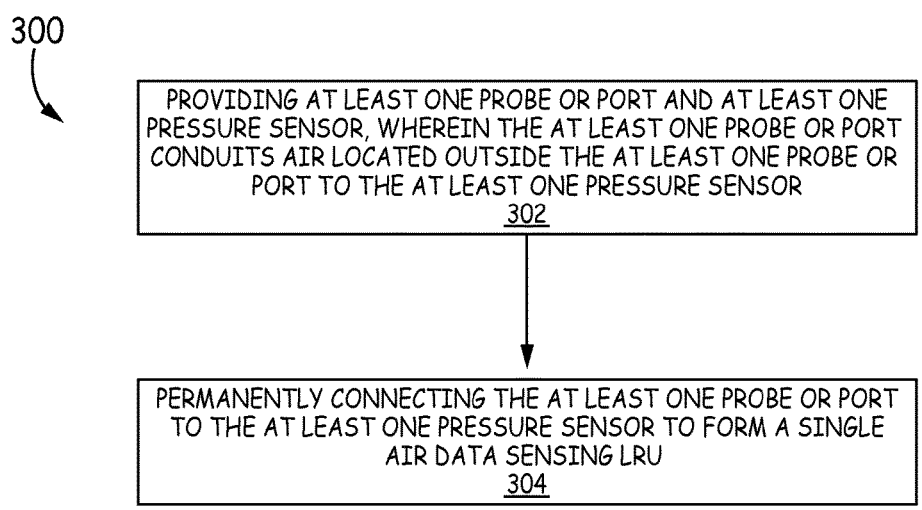
FIG. 3 is an example of a flow diagram for creating an air data sensing LRU.

FIG. 3 is an example flow diagram of a method 300 for creating an air data sensor LRU. The method 300 comprises providing at least one probe or port and at least one pressure sensor, wherein the at least one probe or port conduits air located outside the at least one probe or port to the at least one pressure sensor (block 302). In some embodiments, the probe or port and the pressure sensor can have some or all of the characteristics of the probe or port 104 and the pressure sensor 112 discussed above in FIG. 1. For example, the probe or port can include, but is not limited to, at least one of the following: one or more static ports, one or more pitot tubes, one or more pitot-static tubes, or one or more angle-of-attack vanes. In some embodiments, the air data sensing LRU can further comprise a heating element that is coupled to the probe.

Method 300 further comprises permanently connecting the at least one probe or port to the at least one pressure sensor to form a single air data sensing LRU (block 304). In some embodiments, the at least one probe or port and the at least one pressure sensor can be permanently connected using the techniques described above in FIG. 1, e.g., bonding, brazing or welding the two together. This method provides the same benefits over conventional implementations as discussed above in relation to FIG. 1.

Example Embodiments

Example 1 includes an air data sensing line-replaceable unit (LRU) comprising: at least one pressure sensor; and at least one probe or port coupled to the at least one pressure sensor, wherein the at least one probe or port conduits air located outside the air data sensing LRU to the at least one pressure sensor, and wherein the at least one probe or port and the at least one pressure sensor are connected to each other by a permanent connection.

Example 2 includes the air data sensing LRU of Example 1, wherein the at least one probe or port comprises at least one of the following: one or more static ports, one or more pitot tubes, one or more pitot-static tubes, or one or more angle-of-attack vanes.

Example 3 includes the air data sensing LRU of any of Examples 1-2, wherein the permanent connection is formed by welding the at least one probe or port to the at least one pressure sensor.

Example 4 includes the air data sensing LRU of any of Examples 1-3, wherein the permanent connection is formed by bonding the at least one probe or port to the at least one pressure sensor.

Example 5 includes the air data sensing LRU of any of Examples 1-4, wherein the permanent connection is formed by brazing the at least one probe or port to the at least one pressure sensor.

Example 6 includes the air data sensing LRU of any of Examples 1-5, wherein the at least one pressure sensor converts the air that the at least one probe or port conduits to the at least one pressure sensor into an electrical signal.

Example 7 includes the air data sensing LRU of Example 6, wherein the at least one pressure sensor is coupled to an air data module to convert the electrical signal into a digital signal.

Example 8 includes the air data sensing LRU of any of Examples 6-7, wherein the at least one pressure sensor is coupled to an air data computer, wherein the air data computer calculates at least one of the following from the electrical signal: an altitude of the air data sensing LRU, an airspeed of the air data sensing LRU, or an angle of attack of the LRU.

Example 9 includes a method for constructing an air data sensing LRU comprising: providing at least one probe or port and at least one pressure sensor, wherein the at least one probe or port conduits air located outside the at least one probe or port to the at least one pressure sensor; and permanently connecting the at least one probe or port to the at least one pressure sensor to form a single air data sensing LRU.

Example 10 includes the method of Example 9, wherein the at least one probe or port comprises at least one of the following: one or more static ports, one or more pitot tubes, one or more pitot-static tubes, or one or more angle-of-attack vanes.

Example 11 includes the method of any of Examples 9-10, wherein permanently connecting the at least one probe or port to the at least one pressure sensor comprises welding the two together.

Example 12 includes the method of any of Examples 9-11, wherein permanently connecting the at least one probe or port to the at least one pressure sensor comprises bonding the two together.

Example 13 includes the method of any of Examples 9-12, wherein permanently connecting the at least one probe or port to the at least one pressure sensor comprises brazing the two together.

Example 14 includes a system comprising: an air data sensing LRU comprising: at least one probe, at least one pressure sensor, wherein the at least one probe conduits air outside the system to the at least one pressure sensor, wherein the at least one pressure sensor converts the air that the at least one probe conduits to the at least one pressure sensor into an electrical signal, and wherein the at least one probe and the least one pressure sensor are permanently connected to each other; and an electronic system coupled to the air data sensing LRU, wherein the electronic system receives the electrical signal from the at least one pressure sensor, and wherein the electronic system converts the electrical signal into at least one of the following: a digital signal, an altitude of the air data sensing LRU, an airspeed of the air data sensing LRU, or an angle of attack of the LRU.

Example 15 includes the system of Example 14, wherein the permanent connection is formed by welding the at least one probe or port to the at least one pressure sensor.

Example 16 includes the system of any of Examples 14-15, wherein the permanent connection is formed by bonding the at least one probe or port to the at least one pressure sensor.

Example 17 includes the system of any of Examples 14-16, wherein the permanent connection is formed by brazing the at least one probe or port to the at least one pressure sensor.

Example 18 includes the system of any of Examples 14-17, wherein the electronics system is an air data module, wherein the air data module converts the electrical signal into a digital signal.

Example 19 includes the system of any of Examples 14-18, wherein the electronics system is an air data computer, wherein the air data computer converts the analog electrical signal to at least one of the following: an altitude of the air data sensing LRU, an airspeed of the air data sensing LRU, or an angle of attack of the LRU.

Example 20 includes the system of any of Examples 18-19, wherein the air data module is coupled to at least one of the following: an air data inertial reference unit or a modular avionics unit, wherein the air data inertial reference unit or the modular avionics unit converts the digital signal to at least one of the following: an altitude of the air data sensing LRU, an airspeed of the air data sensing LRU, or an angle of attack of the LRU.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An air data sensing line-replaceable unit (LRU) comprising:
    at least one pressure sensor, wherein the at least one pressure sensor includes a calibration memory that contains information related to calibration of the at least one pressure sensor; and
    more than one probe or port coupled to the at least one pressure sensor, wherein the air data sensing LRU is configured to be coupled to an aircraft,
        wherein the more than one probe or port conduits air located outside the air data sensing LRU and outside the aircraft to the at least one pressure sensor, and
        wherein the more than one probe or port and the at least one pressure sensor are connected to each other by a permanent connection, wherein the permanent connection is non-disconnectable;
    wherein the at least one pressure sensor is configured to generate an analog electrical signal, wherein the at least one pressure sensor is coupled to an electronic system LRU that is separate from the air data sensing LRU and positioned within the aircraft, wherein the at least one pressure sensor is configured to communicate the analog electrical signal to the electronic system LRU, wherein the electronic system LRU is configured to convert the analog electrical signal to a digital signal.

2. The air data sensing LRU of claim 1, wherein the more than one probe or port comprises at least one of the following: one or more static ports, one or more pitot tubes, one or more pitot-static tubes, or one or more angle-of-attack vanes.

3. The air data sensing LRU of claim 1, wherein the permanent connection is a weld.

4. The air data sensing LRU of claim 1, wherein the permanent connection is a bond.

5. The air data sensing LRU of claim 1, wherein the permanent connection is a braze.

6. The air data sensing LRU of claim 1, wherein the at least one electronic system LRU comprises an air data module, wherein the at least one pressure sensor is configured to be coupled to the air data module to convert the analog electrical signal into a digital signal.

7. The air data sensing LRU of claim 1, wherein the at least one electronic system LRU comprises an air data computer, wherein the at least one pressure sensor is configured to be coupled to the air data computer, wherein the air data computer calculates at least one of the following from the analog electrical signal: an altitude of the air data sensing LRU, an airspeed of the air data sensing LRU, or an angle of attack of the air data sensing LRU.

8. A method for constructing an air data sensing line-replaceable unit (LRU) comprising:
    providing more than one probe or port and at least one pressure sensor that includes a calibration memory;
    permanently connecting the more than one probe or port to the at least one pressure sensor to form a single air data sensing LRU, wherein permanently connecting includes establishing a permanent connection that is non-disconnectable, wherein the air data sensing LRU is coupled to an aircraft such that the more than one probe or port conduits air located outside the probe or port to the at least one pressure sensor; and
    coupling the at least one pressure sensor and the calibration memory to at least one electronic system LRU in the aircraft;
    wherein the at least one pressure sensor generates an analog electrical signal, wherein the at least one pressure sensor communicates the analog electrical signal to the at least one electronic system LRU over a communication medium, wherein the at least one electronic system LRU converts the analog electrical signal to a digital signal, wherein the at least one electronic system LRU is separate from the air data sensing LRU and positioned within the aircraft.

9. The method of claim 8, wherein the more than one probe or port comprises one or more static ports, one or more pitot tubes, one or more pitot-static tubes, or one or more angle-of-attack vanes.

10. The method of claim 8, wherein permanently connecting the more than one probe or port to the at least one pressure sensor comprises welding the more than one probe or port and the at least one pressure sensor together.

11. The method of claim 8, wherein permanently connecting the more than one probe or port to the at least one pressure sensor comprises bonding the more than one probe or port and the at least one pressure sensor together.

12. The method of claim 8, wherein permanently connecting the more than one probe or port to the at least one pressure sensor comprises brazing the more than one probe or port and the at least one pressure sensor together.

13. A system comprising:
an air data sensing line-replaceable unit (LRU) coupled to an aircraft, the air data sensing LRU comprising:
more than one probe or port, and
at least one pressure sensor,
wherein the more than one probe or port conduits air outside the air data sensing LRU and outside the aircraft to the at least one pressure sensor,
wherein the at least one pressure sensor converts the air into an analog electrical signal, and
wherein the more than one probe or port and the at least one pressure sensor are connected to each other by a permanent connection,
wherein the permanent connection is non-disconnectable;
an electronic system coupled to the air data sensing LRU,
wherein the electronic system is separate from the air data sensing LRU and positioned within the aircraft,
wherein the electronic system is configured to receive the analog electrical signal from the at least one pressure sensor, and
wherein the electronic system is configured to convert the analog electrical signal into a digital signal; and
an air data inertial reference unit coupled to the electronic system, wherein the air data inertial reference unit converts the digital signal to at least one of the following: an altitude of the air data sensing LRU, an airspeed of the air data sensing LRU, or an angle of attack of the air data sensing LRU.

14. The system of claim 13, wherein the permanent connection is a weld.

15. The system of claim 13, wherein the permanent connection is a bond.

16. The system of claim 13, wherein the permanent connection is a braze.

17. The system of claim 13, wherein the electronic system is an air data module.

18. The system of claim 13, wherein the electronic system is an air data computer.

* * * * *